Oct. 19, 1965  G. KARDAUN ETAL  3,213,169
PROCESS FOR THE MANUFACTURE OF MOULDED PRODUCTS
Filed Dec. 3, 1962
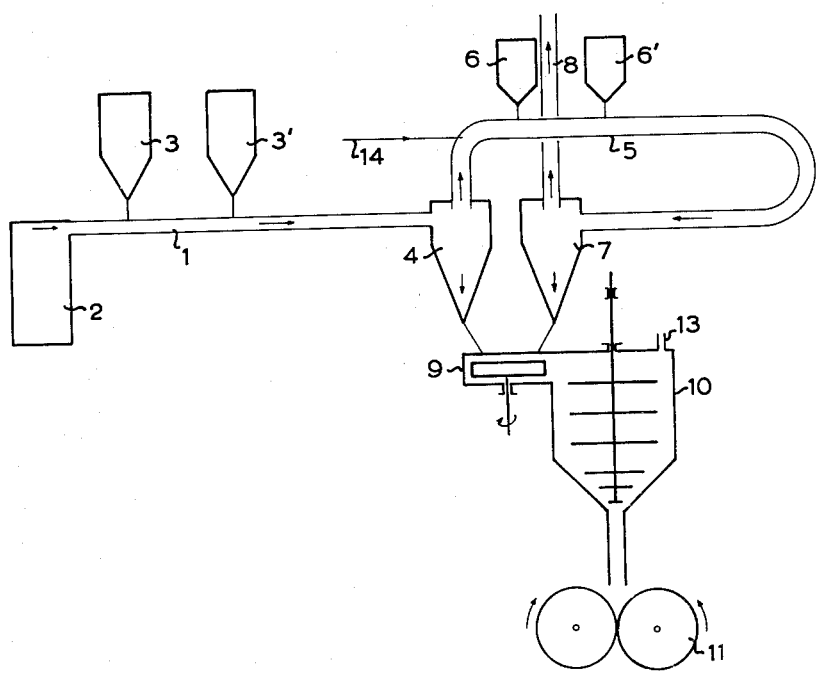

United States Patent Office 3,213,169
Patented Oct. 19, 1965

3,213,169
PROCESS FOR THE MANUFACTURE OF MOULDED PRODUCTS
Georg Kardaun, Stein, Reyer Goettsch, Geleen, and Peter M. Kierkels, Sittard, Netherlands, assignors to Stamicarbon N.V., Heerlen, Netherlands
Filed Dec. 3, 1962, Ser. No. 241,994
Claims priority, application Netherlands, Dec. 5, 1961, 272,190
2 Claims. (Cl. 264—122)

The present invention relates to a process for the manufacture of moulded products, such as briquettes, in particular fuel briquettes, nuts-coal or ovoids, in which process a mixture of coal particles softening at elevated temperature or particles of a substance which, as regards the influence of heating rate on plasticity, shows the same properties as softening coal, and particles that do not, or hardly, soften at that elevated temperature, is heated, as a result of which the particles of the mixture that are to be softened become soft, after which the mixture is pressure moulded into a product of the shape desired.

The invention also relates to moulded products manufactured in accordance with this process. In such a process the bituminous coal softening at elevated temperature, or another plasticisable substance, or a mixture thereof, serves as binding agent for the substance that does not soften at that temperature, hereinafter called "inert," which may consist for instance of coke breeze, coal fines, ore particles, limestone, sand or phosphate rock particles, or of a mixture of two or more of the substances mentioned.

The use of an additional binding agent, such as pitch, in this process has then become superfluous. In the process for the manufacture of moulded objects of this kind as described in the British patent specification 768,-910, a mixture of inert and a substance softening at the compression temperature is obtained at the required compression temperature, by first supplying an amount of inert to a flow of hot gases, as a result of which these inert particles take up heat and the gas flow drops in temperature, and subsequently supplying an amount of the substance to be softened to the gas flow, as a result of which the temperature of the gas flow decreases further. Very rapid intimate mixing takes place between the inert and the substance to be softened; the mixture of solids is then separated from the gas flow in a cyclone in which process further heat-exchange takes place between the inert, which is at a higher temperature level, and the substance to be softened, which is at a lower temperature level. The ratio between the amounts of inert and substance to be softened and their temperatures are so selected that the temperature of the mixture separated from the gas flow by the cyclone is such that the material to be softened indeed becomes soft so that the mixture can be compression-moulded to products of the desired shape.

Besides the advantage of rapid heating and effective heat-exchange between the hot gas flow and the solid particles to be heated up, this method, however, has the drawback that the mixture heated to the required temperature may become sticky in the cyclone so that if the temperature should rise too high at a given composition of the mixture the cyclone is liable to clog up. A proper course of the process can now be ensured only by accurately adjusting to each other the volume of hot gas flow, the temperature thereof, and the amounts of inert and substance to be softened which have to be supplied to this gas flow, and keeping these quantities constant within narrow limits. In consequence of this, the process is sometimes difficult to realize.

In the process according to this invention the above-mentioned drawback is obviated—with preservation of the advantages offered by direct heating of the solid substance in a hot gas flow—by separately heating the inert and the substance to be softened in a hot gas flow, separating the heated inert and the plasticisable substance, which has not yet, or incompletely, been heated up to the softening temperature, from the gas flow, and finally mixing the inert and the substance to be softened, in which treatment the latter is softened and heated to the correct compression temperature by the hot inert. An advanage resulting from this invention is that the compression temperature may now be some tens of degrees centigrade higher than in the old process and even lie near the end of the softening temperature range of the substance to be softened, as a result of which the consumption of softening material, which is more expensive than the inert, can be decreased. Moreover, this method of heating increases the thermal efficiency, because the heating gas eventually issues from the apparatus with a lower temperature than could be achieved in the known process.

Consequently, the invention relates to a process for the manufacture of moulded products, such as briquettes, in particular fuel briquettes, nuts-coal, or ovoids, by hot-pressing a fine-grained mixture of a substance softened at the compression temperature and a substance which has not or hardly softened at that compression temperature, hereinafter called inert, to the desired moulded products, in which process the mixture is heated up to the required temperature by mixing the unheated or insufficiently heated substance to be softened, or a mixture of inert and substance to be softened, with such an amount of inert having a tempertaure above the required temperature-level that after mixing and heat-exchange the whole mixture has the required temperature; the process is characterized in that the inert is heated in direct contact with a hot gas flow, and that after isolation of the heated inert from this gas flow, the latter furthermore comes into direct contact with a substance to be softened by heating, and that after the heated substance to be softened has been isolated from the gas flow, the said substance is mixed with the previously isolated inert of higher temperature.

The process according to the invention will be elucidated with reference to the drawing, in which the process is illustrated schematically. In the situation shown in this figure hot combustion gases from the furnace 2 flow through an insulated conduit 1. The substance to be considered as inert is supplied from one or several bunkers 3 or 3' to the hot gas flow passing through conduit 1 and heated in direct contact with these hot gases; in cyclone 4 a separation is effected between the hot inert and the gas flow; on leaving cyclone 4 the hot gases, which still contain a small amount of inert not caught in cyclone 4, flow through the insulated conduit 5. From one or more bunkers 6, 6', the substance or material to be softened is supplied to conduit 5 in which it is also heated up by the hot gases, after which the gas flow and the material to be softened are separated in cyclone 7, the gases leaving the cyclone through conduit 8.

If the temperature of the gases flowing through conduit 5 should be too high or too low, an additional amount of cool or hot gas may be supplied through conduit 14. Supply or discharge of gas through conduit 14 also, makes it possible to control the flow rate of the gas in conduit 5. If necessary, part of the gas discharged via conduit 8 can be recirculated, for instance by connecting conduit 8 to conduit 14. The solid particles isolated in cyclones 4 and 7 are fed to a mixing device 9 in which the two flows of solid particles drop onto a rapidly rotating stationary disc from which they are flung into buffer bunker 10 as a mixture. Mounted in bunker 10 is a vertical shaft with horizontal stirrers; the mixture is thus kept free-flowing while formation of crusts on the wall is counteracted. During the stay in the bunker the heat exchange between the hotter inert, and the colder substance continues with the result that the latter softens; gases released from the substance, if any, escape through conduit 13.

The buffer bunker 10 is so amply dimensioned that during the transport through the bunker, the desired temperature-exchange between inert and substance to be softened takes place in the mixture and, if the substance to be softened originally contained a large amount of volatile matter, a degasification of the substance to be softened is effected at the same time.

The buffer bunker is so designed as to be free of dead corners, while the residence time in the bunker is virtually equal for all solid particles.

From bunker 10 the mixture drops into the roll press 11. Instead of a roll press a press of another design, such as a ring-roll press or an extrusion press, may of course also be used.

The moulded products obtained may, if desired, be heated further as a result of which they become harder. If the moulded product contains a large proportion of carbon, it may be used as so-called form-coke e.g. in the reduction of iron-ore to iron.

The invention is now further explained by means of a numerical example:

Example

To a hot flue gas flow of initial temperature 1200° C., two tons of ground coke breeze were supplied via bunker 3, and six tons of dry low-volatile fines of 0 to 1 mm. diameter via bunker 3'. At the end of a 6 m. long conduit 1, the hot inert, which has a temperature of 550° C., was separated off in cyclone 4; to the hot gases, whose temperature was decreased to 600° C., two tons of dry bituminous fines per hour (volatile matter content=22%) were supplied from bunker 6. The heated bituminous coal (temperature 350° C.) was separated off in cyclone 7; the hot gases issued through conduit 8 at a temperature of 380° C. These gases may be utilized in the drying furnace of the grinding mill for the fresh coal (not shown in the drawing).

The flows of hot inert and bituminous fines were very rapidly mixed in mixer 9, and after a residence time of two minutes in bunker 10, the mixture was supplied to the roll press at a temperature of 490° C. Gas having a calorific value of 2000 kcal./m.$^3$ (normal temperature pressure) escaped from the bunker via conduit 13. After being cooled to approximately 100° C., the moulded briquettes were carried away on a conveyor belt.

The briquettes had a weight of 18 grammes, a crushing strength of 100 kg., and a volatile matter-content of 8%. The so moulded fuel is weather-resistant and smokeless, and it may be converted to so-called form-coke by carbonization, for instance by immediate carbonization of the briquettes leaving the press in a continuously operating carbonization furnace. A high heating rate is allowed in this operation.

The manufacture of form-coke may start also from high-volatile coal containing for instance 40% of volatile matter. Part of this coal is first degasified. The small coke obtained in this way and the original coal, blended in a 3:2 ratio, are briquetted at 450° C. in accordance with the process specified above, and subsequently carbonized at approximately 1000° C.

What is claimed is:

1. A process for the manufacture of moulded products comprising the steps of: heating a first substance including a desired inert by direct contact with a hot gas flow to a temperature substantially above a predetermined temperature; separating the heated first substance from said gas flow; heating a second substance including a plasticizable material by direct contact with the gas flow from which said first substance was separated to a temperature which is below said predetermined temperature and which is insufficient to soften said second material to a significantly tacky condition; separating the heated second substance from the gas flow; mixing the heated first substance which is above said predetermined temperature with the heated second substance which is below said predetermined temperature; effecting a heat exchange between said heated first and second substances to bring the mixture to said predetermined temperature at which temperature said second substance is sufficiently softened as to constitute a binder for said first substance; and moulding said mixture.

2. The process of claim 1 wherein the moulding step includes compressing said mixture into briquettes at said predetermined temperature.

References Cited by the Examiner

UNITED STATES PATENTS 2,937,080   5/60   Komarek et al. _____ 44—10
3,022,146   2/62   Hullen _____ 44—13

FOREIGN PATENTS 768,910   2/57   Great Britain.

ROBERT F. WHITE, *Primary Examiner.*

ALEXANDER H. BRODMERKEL, *Examiner.*